United States Patent
Song

(10) Patent No.: US 8,259,003 B2
(45) Date of Patent: Sep. 4, 2012

(54) HIGH DUTY CYCLE RADAR WITH NEAR/FAR PULSE COMPRESSION INTERFERENCE MITIGATION

(75) Inventor: William S. Song, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 327 days.

(21) Appl. No.: 12/780,221

(22) Filed: May 14, 2010

(65) Prior Publication Data

US 2011/0279307 A1  Nov. 17, 2011

(51) Int. Cl.
    *G01S 13/32*  (2006.01)
(52) U.S. Cl. .................. 342/132; 342/134; 342/145
(58) Field of Classification Search .............. 342/132, 342/134, 145, 195
    See application file for complete search history.

(56) References Cited

U.S. PATENT DOCUMENTS

| | | | |
|---|---|---|---|
| 5,036,324 A | | 7/1991 | Lamper et al. |
| 5,075,863 A | * | 12/1991 | Nagamune et al. ........... 702/159 |
| 5,103,233 A | | 4/1992 | Gallagher et al. |
| 5,173,706 A | * | 12/1992 | Urkowitz ....................... 342/99 |
| 5,293,114 A | | 3/1994 | McCormick et al. |
| RE35,607 E | * | 9/1997 | Nagamune et al. ........... 702/158 |
| 5,712,640 A | | 1/1998 | Andou et al. |
| 5,719,580 A | | 2/1998 | Core |
| 5,726,657 A | * | 3/1998 | Pergande et al. .............. 342/202 |
| 5,734,346 A | * | 3/1998 | Richardson et al. .......... 342/124 |
| 6,020,843 A | | 2/2000 | Kirkorian et al. |
| 6,342,851 B1 | | 1/2002 | Andersson |
| 2001/0015698 A1 | | 8/2001 | Tokoro |
| 2008/0218400 A1 | | 9/2008 | Stolarczyk et al. |
| 2011/0221633 A1 | * | 9/2011 | Schramm et al. ............. 342/394 |
| 2011/0279307 A1 | * | 11/2011 | Song ............................. 342/132 |

FOREIGN PATENT DOCUMENTS

| | | | |
|---|---|---|---|
| JP | 2005201727 A | * | 7/2005 |
| JP | 2009103510 A | * | 5/2009 |

OTHER PUBLICATIONS

International Search Report dated Sep. 30, 2011 of PCT/US2011/028092.
Billam, E.R., "Eclipsing Effects With High-Duty-Factor Waveforms in Long-Range Radar," *IEEE Proceedings*, 132(7):598-603, (1985).

(Continued)

*Primary Examiner* — John B Sotomayor
(74) *Attorney, Agent, or Firm* — Foley & Lardner LLP

(57) ABSTRACT

In conventional pulse compression processing, sidelobes from strong return signals may hide correlation peaks associated with weaker return signals. Example embodiments include methods of mitigating this near/far interference by weighting a received return signal or corresponding reference signal based the return signal's time of arrival, then performing pulse compression using the weighted signal to produce a correlation peak that is not hidden by sidelobes from another return. Multi-frequency processing can also be used to reduce the pulse width of the transmitted pulses and received return signals, thereby mitigating near/far interference by decreasing the overlap between signals from nearby targets. Weighting can be combined with multi-frequency pulse transmission and reception to further enhance the fidelity of the processed correlation peak. Weighting and multi-frequency processing also enable higher duty cycles than are possible with conventional pulse compression radars.

28 Claims, 7 Drawing Sheets

OTHER PUBLICATIONS

Blanton, J.L., "Cued Medium-PRF Air-to-Air Radar Using Stretch Range Compression," *Presented at the IEEE 1996 National Radar Conference*, Ann Arbor, Michigan, May 13-16, 1996, pp. 208-213.

Kassab, R., et al., "Quasi-Continuous Waveform Design for Dynamic Range Reduction," *IET Electronics Letters*, 44(10):646-648, (2008).

Khan, R., et al., "Target Detection and Tracking with a High Frequency Ground Wave Radar," *IEEE Journal of Oceanic Engineering*, 19(4):540-548, (1994).

Ringel, M.B., "A High Duty Factor Chirp Radar," *IEEE*, pp. 1114-1119, (1978).

* cited by examiner

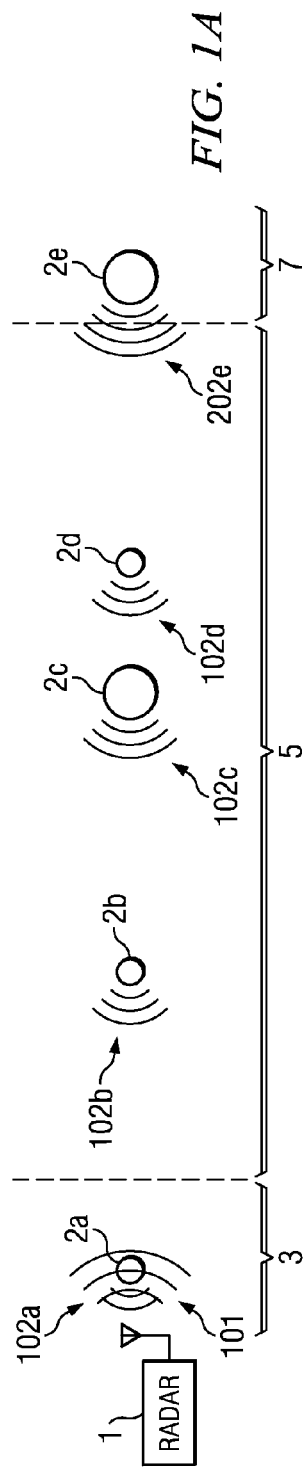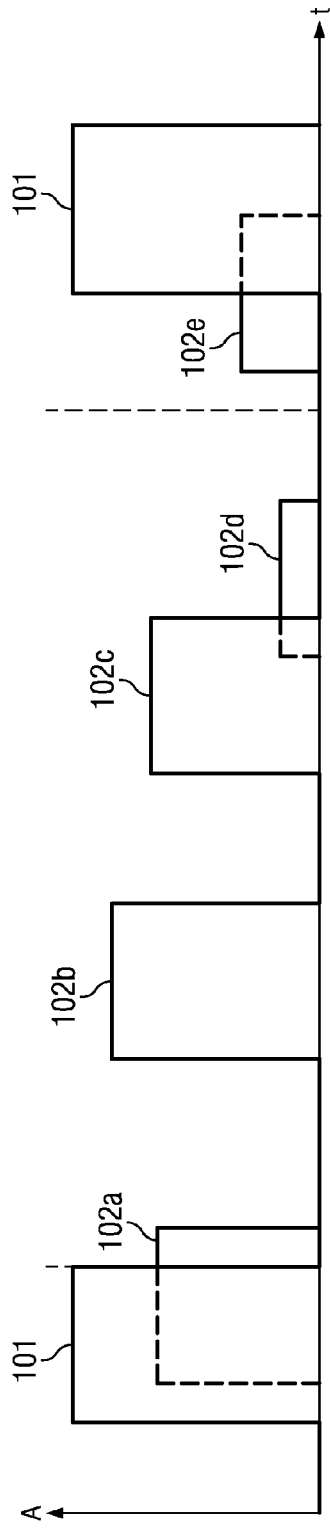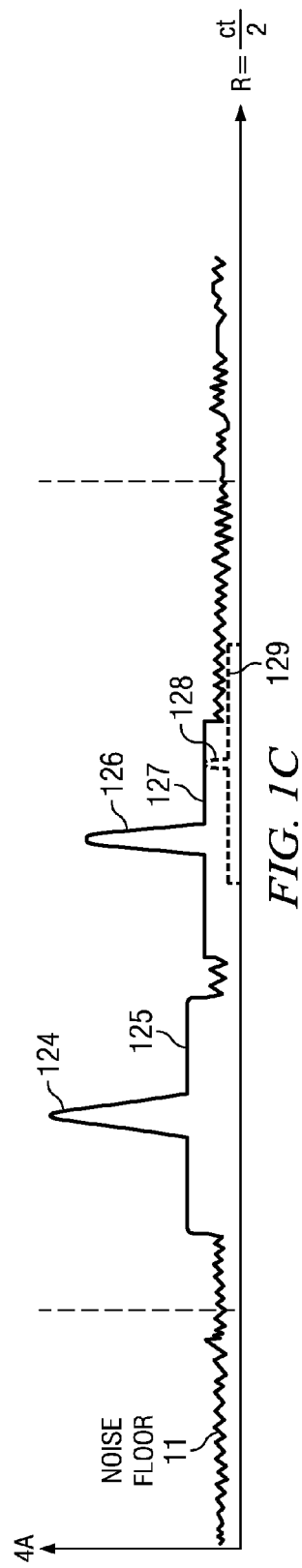

HIGH DUTY CYCLE RADAR WITH NEAR/FAR PULSE COMPRESSION INTERFERENCE MITIGATION

GOVERNMENT SUPPORT

This invention was supported, in whole or in part, by contract no. FA8721-05-C-0002 from the Department of the Air Force. The Government has certain rights in this invention.

BACKGROUND OF THE INVENTION

Radar, sonar, lidar, and other remote sensing techniques involve locating a target by measuring the time-of-flight of an electromagnetic pulse from an antenna to the target and back again. The farther the target is from the antenna, the longer the delay between transmission of the pulse and reception of the return signal from the target. The delay increases linearly with the range to the target, but the amplitude of the return signal varies as $1/R^4$, where R is the range to the target. Thus, a doubling of radar range requires a sixteen-fold increase in amplitude of the emitted pulses.

To achieve fine range resolution, the emitted pulses should have wide bandwidth. For single-frequency pulses, the bandwidth increases as the pulse width decreases, so making a single-frequency pulse shorter increases the range resolution. If the pulse amplitude remains constant, however, then the total pulse energy drops as the pulse duration decreases, causing a corresponding decrease in radar range given a constant receiver sensitivity and noise floor. Although increasing the pulse amplitude offsets the decrease in radar range due to the decrease in pulse duration, limits on peak pulse amplitude usually prevent simultaneous measurement of targets at the farther ranges with the finest possible range resolution.

Range limits imposed by peak pulse amplitude can be overcome by chirping or encoding the emitted pulses to increase their bandwidth without decreasing their duration. Because the pulse duration remains long, the total pulse energy stays high despite limits on peak pulse amplitude, allowing long range detection with fine range resolution. Spreading the pulse energy in time also causes the return signal to spread in time, which may cause the peak of the return signal to fall below detectable limits despite the fact that the return signal contains a detectable amount of energy.

Fortunately, pulse compression makes it possible to recover range information from return signals that may be obscured by noise. Pulse compression processing combines the benefits of high pulse energy and fine range resolution of long signals with the detectability of short return pulses. In pulse compression processing, a long coded or chirped return pulse is correlated against a replica of the identically coded or chirped transmitted pulse. Correlation redistributes most of the received energy into the main lobe of the correlation peak, but does not affect the distribution of noise energy. As a result, correlation has an effect similar to amplification: it increases the amplitude of the peak relative to the noise floor by an amount equal to the pulse compression factor, $T\Delta f$, where T and $\Delta f$ are the duration and bandwidth, respectively, of the transmitted pulse. For more on pulse compression and radar, see M. I. Skolnik, ed., Radar Handbook (McGraw-Hill 3rd ed. 2008).

After correlation, not all of the received energy is in the main correlation peak; some energy ends up in time sidelobes on both sides of the main lobe. In some cases, time sidelobes may obscure main lobes that represent other targets. For example, if a large target and a small target are close enough to each other in the radar's field of view, they will produce returns that overlap in time. Pulse compressing the overlapping returns produces a large peak for the large target and a small peak for the small target. If the size difference between the targets is large enough, the sidelobes associated with the large target may be larger than the main lobe associated with the small target, making it difficult, if not impossible, to resolve the small target. Windowing and coding can suppress time sidelobes, but it is often difficult to eliminate time sidelobes completely, and windowing may filter out the signal from the small target as well.

SUMMARY

Example embodiments include a method and apparatus for determining range information associated with a target. Example methods include receiving near and far return signals reflected from near and far targets, respectively. If the near and far targets are close enough together, then the near and far return signals overlap in time at the receiver, which can cause the return signals to interfere with each other, and thus obscure the weaker of the two return signals. (Typically, range effects cause the far return signal to be weaker than the near return signal.) Weighting at least part of the portion of the weaker return signal that overlaps with the near return signal yields a weighted return signal that is at least partially free of interference from the stronger return signal. The weighted return signal can be pulse compressed to produce to determine the range from the receiver to the corresponding target.

Generally, weighting involves adjusting the amplitude and/or phase of the weaker return signal or a reference signal associated with the weaker return signal. In some embodiments, weighting may include applying a weighting function whose shape varies with the time delay associated with the far return signal. For example, the shape or width of the weighting function may vary linearly with the far return signal's time of arrival. Weighting may also include applying a window function to the weaker return signal, e.g., to mitigate interference or leakage of the and/or to reduce time sidelobes in the pulse compressed output. In some embodiments, the weighting is controlled adaptively, e.g., by detecting the amount of overlap, then adjusting the weighting accordingly. Weighting can also vary in response to external input.

Pulse compression can be performed in the frequency domain by Fourier transforming the weighted far return signal; multiplying the frequency-domain weighted far return signal with a frequency-domain reference signal; then inverse Fourier transforming the resulting frequency-domain product to produce the range information. A suitable frequency-domain reference signal may be generated by Fourier transforming a weighted replica of the transmitted pulse used to illuminate the targets. Alternately, pulse compression may be performed in the time domain by correlating the weighted far return with a corresponding weighted reference signal.

Further embodiments may include transmitting a pulse towards the near and far targets, where the transmitted pulse reflects off the near and far targets to produce the near and far signal returns, respectively. The pulse may be a coded pulse, such as a pulse encoded with a pseudonoise (PN) code, Barker code, Goulay code, or other suitable code. Alternatively, the pulse may be a chirped pulse or even an up/down chirp, where different sections of the chirp have different chirp rates. Some pulses, such as PN-coded pulses and up/down chirps, include portions or sub-pulses whose bandwidths are substantially the same as the bandwidth of the entire pulse.

The present inventive techniques may also be used with multi-frequency transmitters and receivers. For example, the transmitter may emit two or more pulses, each of which is at a different carrier frequency and may be narrower than in the single-frequency case. The receiver detects one set of return signals at each carrier frequency, filters the sets of return signals by carrier frequency, and, optionally, weights the filtered far return signals based on the overlap between the near and far return signals. (The weighting may be different for each set of return signals.) Performing pulse compression processing on each set of (optionally weighted) signals yields additional range information about the far target that can be combined to produce an enhanced estimate of a location of the far target.

Embodiments of multi-frequency signal processing include methods of determining range information associated with a target that is farther from a receiver than at least one other target. The receiver detects a plurality of return signals reflected from the target, each of which is at a different carrier frequency. A waveform generator generates a plurality of reference signals, each of which corresponds to a respective return signal. A processor weights the return signals, the reference signals, or a combination of the return signals and reference signals, then performs pulse compression processing using the weighted signals to determine range information associated with the target that is at least partially free of interference from the other, closer target.

Alternative embodiments may employ digital signal processing techniques to weight a first return signal that overlaps with a second return signal. For example, embodiments may include an analog-to-digital converter that samples the first return signal to produce a first return vector, which is a digital representation of the first return signal. The first return vector is weighted based on the overlap between the first and second return signals. In some cases, the overlap is known ahead of time or estimated based on prior knowledge; in other cases, the overlap may be determined using the received return signals and adjusted adaptively to minimize interference. The weighted first return vector is then pulse compressed to produce range information that is substantially free of interference from the second return signal.

Compared to other radar signal processing techniques, embodiments of the present inventive techniques enable detection of targets that would otherwise be hidden or obscured by other targets or transmitted pulses. They also enable operation of radars at duty cycles close to or at the practical limit of 50%. At first glance, weighting weak return signals by discarding energy seems highly undesirable because it may reduce the signal-to-noise ratio (SNR) and/or the ratio of signal power to sidelobe power of the received signal. Any loss in SNR is more than offset by the corresponding suppression in sidelobe power, however, so discarding received return signal energy actually increases the ability to resolve weak return signals.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-1C illustrate conventional pulse compression techniques for detecting targets with a radar.

DETAILED DESCRIPTION OF EXAMPLE EMBODIMENTS

Figure 2A:
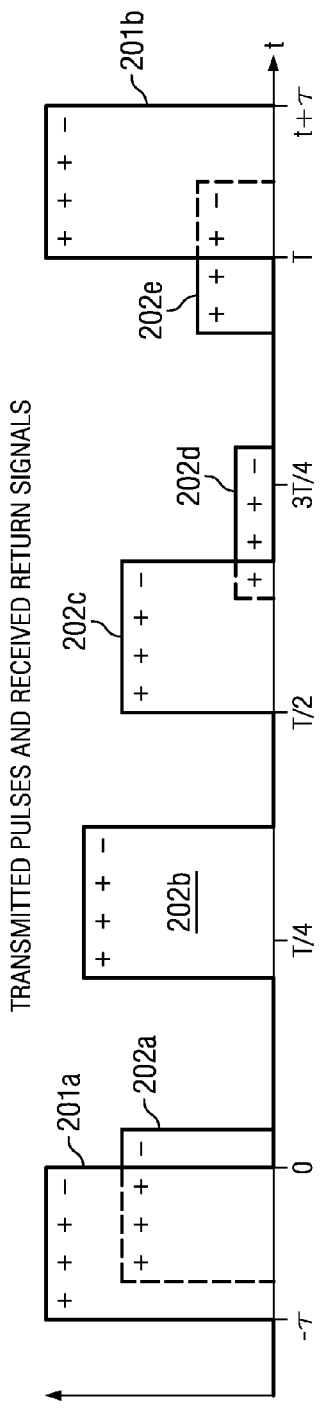
FIGS. 2A-2C illustrate pulse compression techniques that mitigate near/far interference.

A description of example embodiments of the invention follows.

FIGS. 1A-1C illustrate conventional pulse compression processing for radar return signals from a variety of targets. As shown in FIGS. 1A and 1B, a radar 1 transmits signals 101 towards targets 2a-2e (collectively, targets 2) at a duty cycle of about 15%. The size of each target represents the size of its radar cross section. (The targets and ranges are not drawn to scale.) Each target reflects the transmitted pulse back towards the radar 1, which receives each reflected pulse at a delay equal to the product of the pulse propagation speed and the round-trip distance between the radar 1 and the subject target. In this example, target 2a reflects the transmitted signal 101 to produce a return signal 102a; target 2b produces a return signal 102b; and so on. The return signals are processed using standard pulse compression to produce the correlation peaks shown in FIG. 1C, where the location of each peak corresponds to the range, R, from the radar 1 to the corresponding target.

Not every return signal can be processed successfully; some are eclipsed by the transmitted signal, and others are hidden by the time sidelobes of adjacent correlation peaks. For example, the transmitted signal 101 eclipses the leading edge of the return signal 102a from the closest target 2a because the round-trip time from the radar 1 to the closest target 2a is less than the duration of the transmitted signal 101. The radar 1 cannot detect signals while transmitting because the transmitted signal 101 is usually much, much stronger than any of the return signals and would burn out the receiver. As a result, the radar 1 cannot transmit and receive simultaneously, effectively obscuring the nearest target 2a because it falls within the transmission window. The transmitted signals 101 may also bound the maximum range of the radar for similar reasons: the leading edge of a subsequent transmitted signal 101 may eclipse the return signal 102e from the farthest target 2e. To avoid transmitting and receiving simultaneously, the radar 1 may block, or gate, return signals that are received too soon or too late. Range gating creates a near blind spot 3 determined by the pulse duration and a far blind spot 7 determined by the pulse duration and the pulse repetition rate.

Targets 2b, 2c, and 2d are within the radar's useful range 5, so they produce return signals 102b, 102c, and 102d, respectively, that can be processed to find the ranges from the radar 1 to the targets 2b, 2c, and 2d. If the transmitted signal 101 is coded or chirped, it can be correlated with the detected return signals 102b, 102c, and 102d using the pulse compression techniques described above. Pulse compression redistributes the detected energy into correlation peaks 124, 126, and 128 that stick up higher above the receiver's noise floor 11 than the uncompressed return signals 102*b*, 102*c*, and 102*d*.

Pulse compression also introduces time sidelobes 125, 127, and 129 that extend from each of the correlation peaks 124, 126, and 128, respectively. For isolated targets, such as target 2*b*, time sidelobes 125 generally do not have any deleterious effects. For targets in cluttered areas or in close proximity to each other, such as targets 2*c* and 2*d*, time sidelobes from large targets may obscure correlation peaks associated with nearby smaller targets. In the example shown in FIG. 1C, the mid-range targets 2*c* and 2*d* are within a distance D=cT/2 of each other given a pulse duration T and pulse propagation speed c. As a result, the time sidelobes 127 associated with target 2*c* hide the correlation peak 128 associated with target 2*d*. Moreover, because target 2*d* produces such a weak return signal 102*d*, its associated time sidelobes 129 cannot be detected either because they fall below the noise floor 11. As a result, target 2*d* cannot be detected using conventional pulse compression processing.

Cross-Pulse Interference Mitigation with Weighted Pulse Compression

Example embodiments provide pulse compression processing that enables detection of weak return signals from targets with small radar cross sections in the presence of time sidelobes from nearby, stronger targets. Interference between near and far targets is mitigated by varying the portion of the pulse used for pulse compression. In some examples, only the portion of the pulse that does not encounter high-level near/far interference is used for pulse compression. Alternatively, the pulse may be weighted or windowed to minimize near/far interference and to suppress time sidelobes that may conceal or interfere with returns from other targets.

Figure 2B:
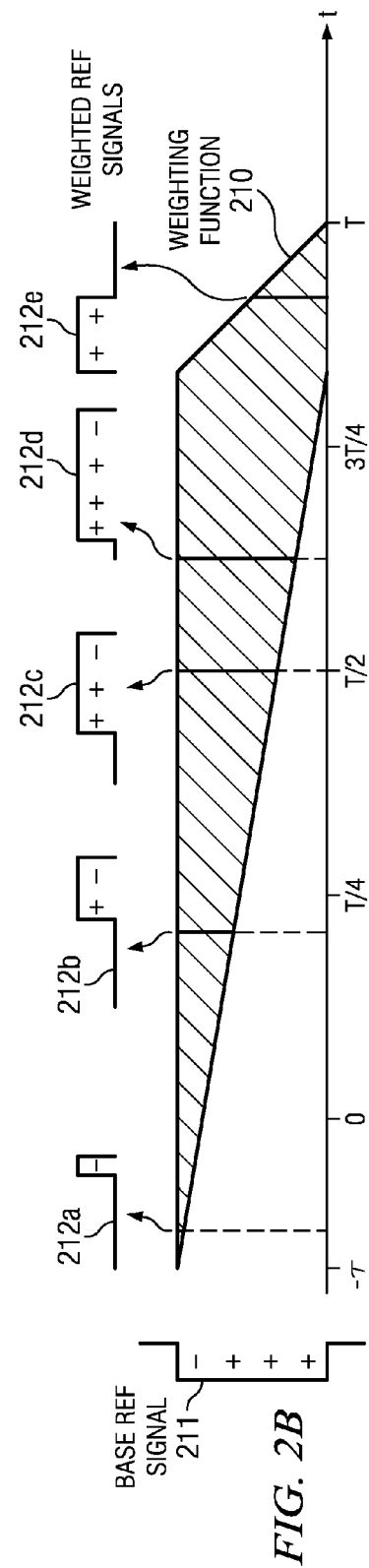
Figure 2C:
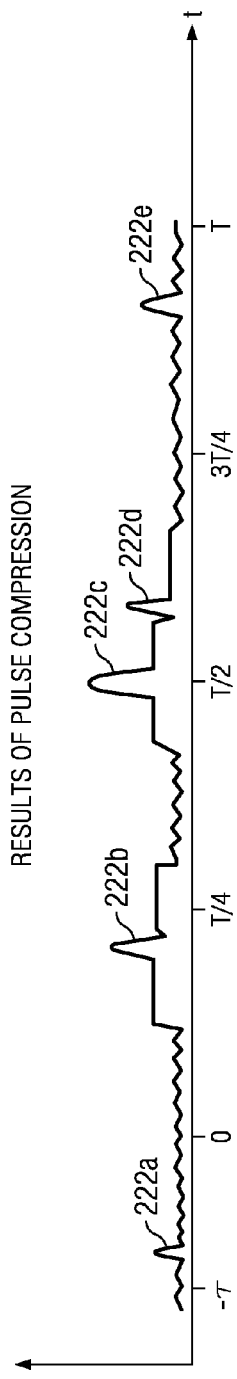

FIGS. 2A-2C illustrate pulse compression processing for such interference mitigation. FIG. 2A illustrates pulse compression processing of return signals 202*a*-202*e* (collectively, return signals 202) using weighted reference signals 212*a*-212*f* (collectively, reference signals 212). The return signals 202 are generated by transmitting coded pulses 201*a* and 201*b* (collectively, coded pulses 201) of duration towards targets distributed in the pattern shown in FIG. 1A, then detecting the reflections of the transmitted pulse 201 from the targets over a period T. The return signals 202 are coded in the same fashion as the transmitted pulse 201, where plus ("+") and minus ("−") signs at the top of the transmitted pulses 201 and return signals 202 indicate the coding pattern. Those skilled in the art will understand that the coding pattern shown in FIG. 2A is one example of a wide variety of suitable coding patterns, and that the plus and minus signs may indicate the relative phase, amplitude, and/or chirp rate of successive portions of the transmitted pulses 201 and return signals 202.

For example, the transmitted signal 201 may be a pulse encoded with a PN code, a Barker code, Goulay code, or other suitable code. Alternatively, it may be a chirped signal, such as an up-down chirp signal, i.e., a signal whose instantaneous frequency ramps up and down at different rates over a given band as the signal evolves. For example, the first segment of an up-down chirp might sweep up over a 100 MHz band at 1 MHz/µs, then the second segment sweeps down over the same band at 2 MHz/µs, before the third segment sweeps back up at 3 MHz/µs, and so on. Because each segment of the up-down chirp covers the same bandwidth, the bandwidth any individual segment is substantially the same as the bandwidth of the entire up-down chirp signal. At the same time, the segments do not correlate with each other because they are at different chirp rates, so a pulse-compressed up-down chirp signal does not have large sidelobes.

The range to each target is determined by correlating the return signals 202 against weighted reference signals 212 in a modified version of the pulse compression processing described above. Rather than correlating each return signal 202 against a base reference signal 211, as in conventional pulse compression processing, each return signal 202 is correlated with a different weighted reference signal 212, where the weighting depends on the weighting function 210. Weighting may be determined or estimated beforehand; it may also be adjusted during operation. In general, though, weighting prevents sidelobes associated with stronger near return signals from obscuring peaks associated with into weaker far return signals.

FIG. 2B is a top view of a surface plot of the weighting function 210 whose amplitude varies with the time of arrival (horizontal axis). The variable amplitude is projected onto the base reference signal 211 (vertical axis). Shading represents the amplitude of the weighting function 210: the shaded area of the weighting function 210 represents a weight of "1" applied to the base reference signal 211, whereas the unshaded area represents a weight of "0." Although the weighting function 210 shown here varies in a piecewise linear fashion with the time of arrival, other weighting functions are also possible. For example, the amplitude of the weighting function may vary exponentially or logarithmically with the time of arrival. In addition, the edges of the weighting function (i.e., the boundaries between shaded and unshaded regions) may taper smoothly to prevent ringing in the processed returns.

Vertical slices of the weighting function 210 are multiplied with the base reference signal 211 to produce the weighted reference signals 212 used for pulse compression processing. Echoes from close targets, such as return signals 202*a* and 202*b*, are correlated with reference signals whose leading edges are heavily suppressed, such as weighted reference signals 212*a* and 212*b*. Echoes from farther targets, such as return signals 202*c* and 202*d*, are correlated with weighted replicas that whose leading edges are barely suppressed, such as weighted reference signals 212*c* and 212*d*. As the time of arrival approaches the beginning of the next transmitted pulse 201*b*, the weighting function 210 suppresses the trailing portion of the base reference signal 211 to mitigate eclipse of the farthest return 202*e* by the next transmitted pulse 201*b*. Those skilled in the art will appreciate that the return signals 202 may be weighted instead of the reference signals 212, and that the weighted return signals may be correlated against the base reference signal 211 to obtain results equivalent to those shown in FIG. 2C.

FIG. 2C shows a plot illustrating the results of pulse compression processing using the weighted reference signals 212. Peaks from isolated, relatively close targets, such as peak 222*b*, are smaller than compared to peaks generated pulse compression processing without weighting because of the effective reduction in useful signal power due to weighting. On the other hand, weighting mitigates the near-far interference that would otherwise cause sidelobes to obscure peaks from farther targets in cluttered surroundings, such as peak 222*d*. In addition, weighting makes it possible to see peaks 222*a* and 222*e*, which would otherwise be eclipsed by the transmitted pulses.

Linear Scaling Factors for Pulse Weighting

Figure 3:
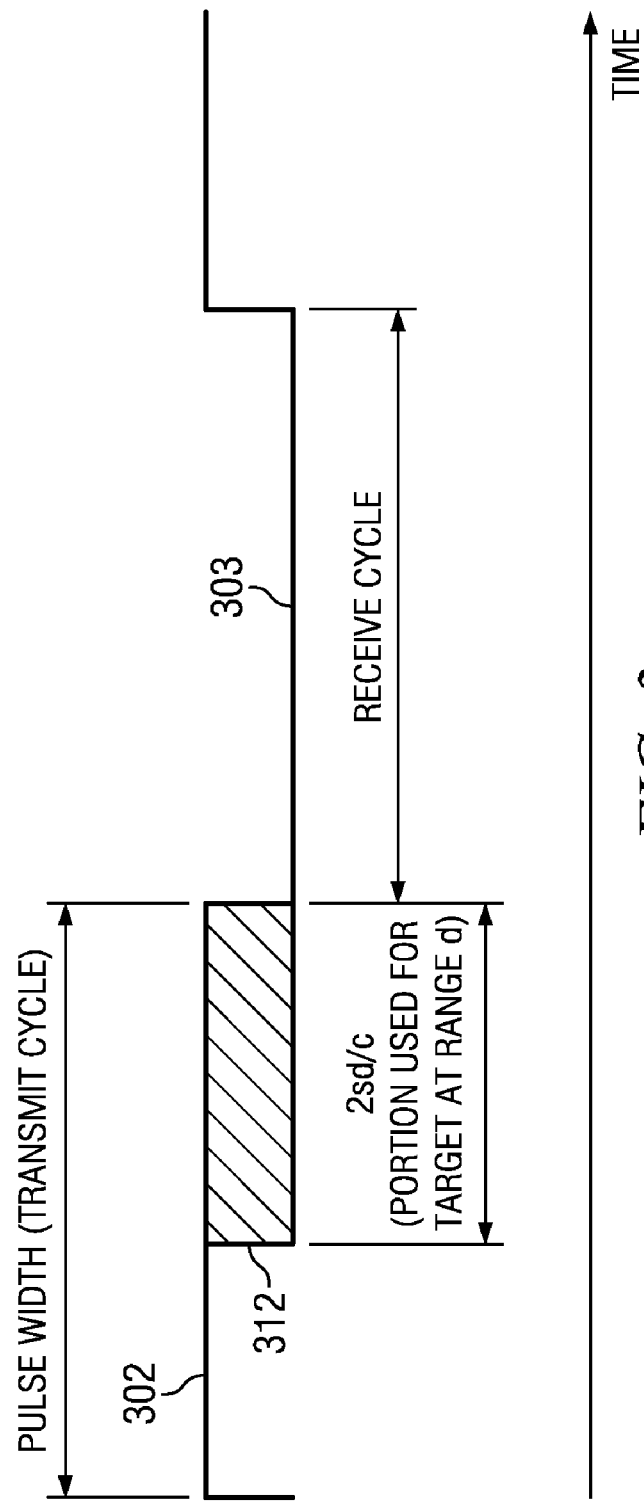
FIG. 3 illustrates linearly scaling the width of the pulse based on target range.

FIG. 3 shows an embodiment in which the fraction 312 of a return signal 302 to be weighted is determined by a scaling factor s, which varies between zero and one, depending on the range of the target from the receiver. For a target at a distance d, for example, only the portion 312 of the pulse of duration 2sd/c at the end of the pulse 302 is used for pulse compression, where c is the pulse propagation speed, e.g., the speed of light. This ensures that the pulse compression does not include the energy from the targets that are closer to the antenna than a distance (1−s)d. Because the pulse width is equal to $2sd_{max}/c$ and the receive cycle width 303 is $2d_{max}/c$, the duty cycle is equal to $(2sd_{max}/c)/(2sd_{max}+2d_{max}/c)=s/(s+1)$. In general, smaller values of s result in less near/far interference, but have smaller pulse widths and lower duty cycles.

When s=1, the obstacles of the prior art regarding duty cycle and near/far interference are not overcome. Thus, smaller values of s should be used if near/far interference is a concern. For example, when s=½, then the pulse compression for a target at distance d only uses the end portion of the pulse (i.e., a portion corresponding to the time τ=d/c) thus avoiding interference from targets that are closer than d/2. This is a reasonable case since the return from the same size target at half the distance away has sixteen times the power (i.e., a power increase of 12 dB). Assuming that the pulse compression gain is significantly greater than 12 dB, one should be able to get a good detection performance despite any drop in power.

Additional pulse compression gain may be required when the targets vary significantly in size. The maximum pulse width when s=½ is $d_{max}/c$, and the entire pulse may be used for pulse compression of returns from targets at the maximum range. At this value of s, the duty cycle can be as high as 33.3%. The detection performance of the closer target does not suffer much from using the reduced pulse portion for pulse compression since the radar return power increases as distance gets closer (i.e., return signal amplitude scales as $1/d^4$). Using s<½ provides even less near/far target interference, but results in shorter pulse widths and lower duty cycles. Using ½<s<1 provides higher duty cycles but may result in greater near/far interference.

For targets very close to the radar, linearly scaling the pulse width used for pulse compression can reduce the pulse width to the extent that it is impractical the detect the received return signal. It is also possible that shorter pulse width may not provide enough pulse compression gain to overcome the near/far interference. In these cases, a number of strategies may be used to mitigate the problem. One simple strategy is to set the minimum detectable distance $d_{min}$ far enough away so that these issues do not become significant. This works for radars that do not have very close $d_{min}$ requirement. It may be somewhat rare for far-looking radar to have to also detect targets that are very close by.

Another strategy is to set the minimum pulse width used for pulse compression of nearby targets to a small practical value, and then accept the resulting near/far interference at very close ranges. Since the close ranges cover very little volume compared to the far ranges, and since small pulse width is used for pulse compression at close ranges, the chance of near/far interference is relatively small. In this case, one could pad zeros at the beginning of the sampled receive cycle before the pulse compression process for the very close and very far ranges as is well understood in the art.

It is also possible to use other scaling functions, including nonlinear functions, piecewise linear functions, stepped functions (e.g., sub-pulse-based pulse compression as described below), etc. The main idea is to pick the portion of the pulse that will give reduced near/far interference while providing high pulse compression gain. This mainly involves picking the starting point of the pulse portion. The ending point of the pulse is generally set to the end of the pulse. Even though it is possible to move the ending point, moving the ending point generally results in less pulse compression gain.

Sub-Pulses for Increased Processing Throughput

While having continuously varying pulse width for targets at different ranges provides good near/far interference mitigation performance with high duty cycle operation, it can require very high computational throughput. Such may be the case, for example, when using fast Fourier transforms (FFTs) and inverse fast Fourier transforms (IFFTs) for pulse compression. In general, pulse compression based on FFT/IFFT has much lower computational throughput than pulse compression based on finite impulse response (FIR). However, in order to provide different pulse compression pulse widths for each range gate, as described with respect to FIG. 3, one may have to perform a set of FFTs and IFFTs for each range gate, resulting in a computational throughput that is undesirably high. Even though it is possible to reduce computational throughput with more efficient algorithms, such as using FFT/IFFT for coarse range gate range increments and using FIR for computing the difference between fine range increments and coarse range increments, the continuous pulse width pulse compression can still require high computational throughput.

Figure 4:
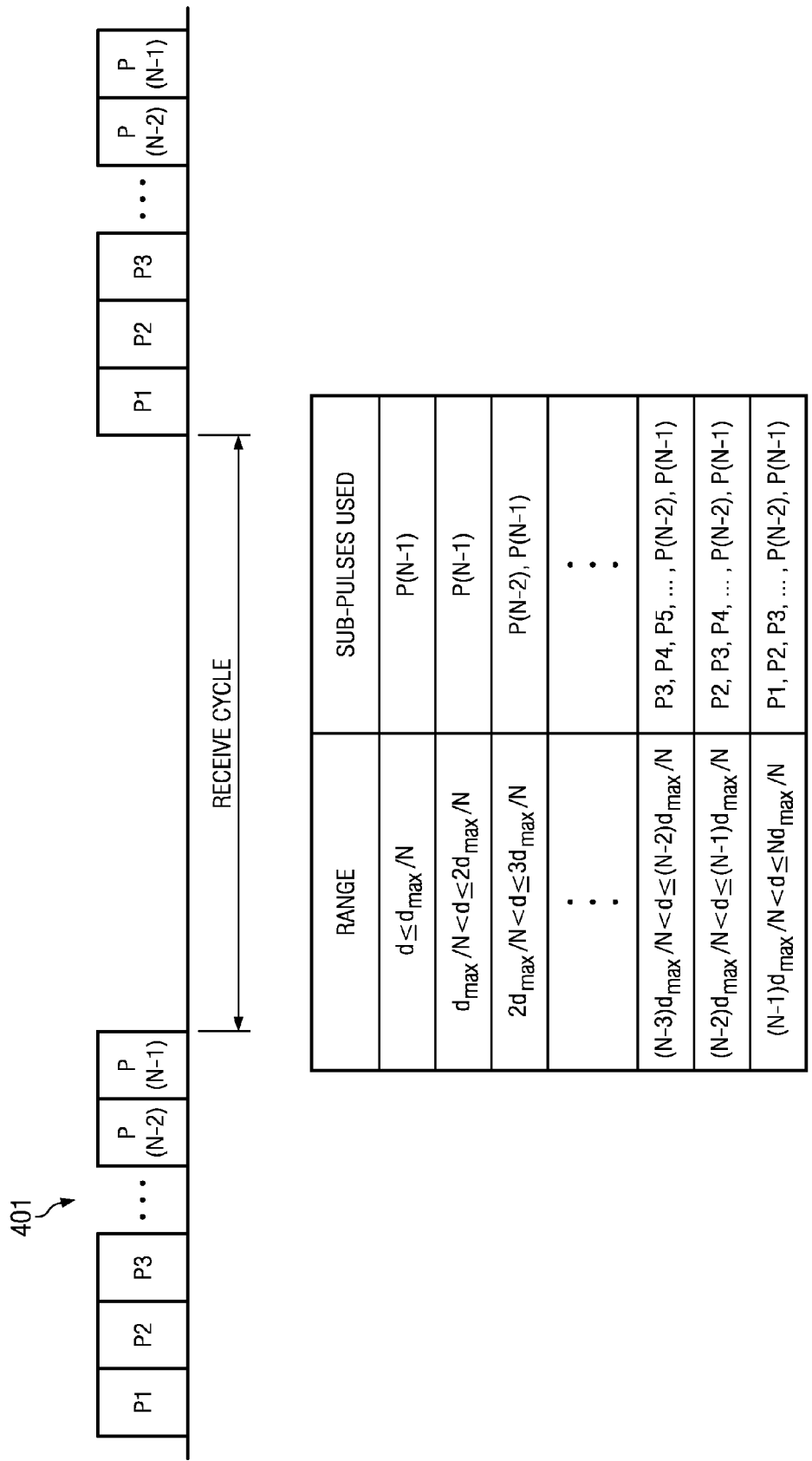
FIG. 4 illustrates sub-pulse sequences based on target range that reduce computational load.

Dividing a transmit pulse 401 into multiple sub-pulses, as shown in FIG. 4, enables reduction of the computational throughput required for pulse compression. This shows a method of using N−1 equal-width sub-pulses to cover N equal-length range zones. Sub-pulses are shown as P1, P2, . . . , P(N−2), P(N−1). The width of each sub-pulse is equal to $2sd_{max}/Nc$ and the length of each range zone is equal to $d_{max}/N$, as shown in the table of FIG. 4. It is also possible to make the pulse widths and the range zone lengths non-uniform and still gain in duty cycle. There is no hard requirement for equal pulse widths or range zone lengths except for convenience.

Pulse compression is performed on each of N−1 sub-pulses independently. The pulse compression results for each of the sub-pulses are then integrated coherently taking into account the appropriate sub-pulses to be integrated for each range gate zone to yield the overall pulse compression result. An alternative approach is to perform the pulse compression for a given range gate zone in one step by using all of the appropriate sub-pulses, which is equivalent to having a stepped function in the pulse widths used with respect to d. The maximum achievable duty cycle when s=½ is (N−1)/(3N−1), or slightly less than 33.3% in the continuous pulse compression width case due to sub-pulse related segmentation. The main advantage using sub-pulses for pulse-compression is that there are only N−1 (or N, depending on implementation) FFT/IFFT-based pulse compressions, which results in much less computation assuming reasonably small N. The maximum achievable pulse width and duty cycle are slightly smaller than the continuous pulse compression width case.

Pulse compression in the closest rage gate zone may be handled differently from other zones in a manner similar to the continuous pulse width case discussed above. For the closest zone, the sub-pulse P(N−1) is used for pulse compression with zeros padded at the beginning of the receive cycle, thus accepting some potential interference. Because the radar coverage volume is relatively small in the closest zone, the probability of interference tends to be smaller in the closest zone than in other zones. It is possible to use a fixed sub-portion of P(N−1) for pulse compression of the nearest range zone for less interference. Another alternative is to simply not process the zone, thus effectively setting $d_{max}/N$ as minimum detectable distance $d_{min}$. One could also use a combination of previously mentioned methods and set the $d_{min}$ to be less that $d_{max}/N$ and use less than full portion of the sub-pulse P(N−1) for pulse compression.

Interference Mitigation with Pulses at Different Carrier Frequencies

Figure 5:
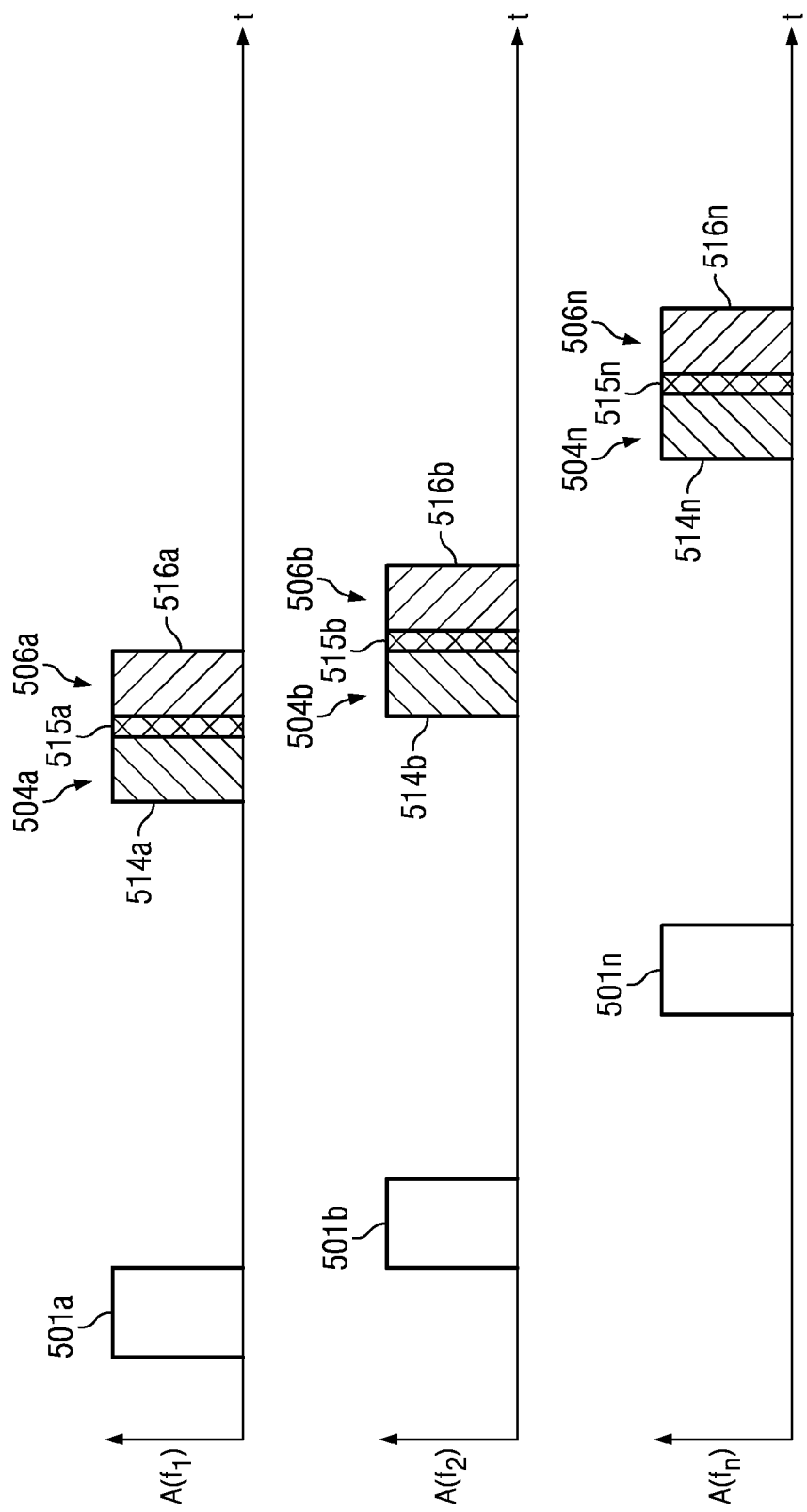
FIG. 5 illustrates multi-frequency pulse compression techniques that increase duty cycle and mitigate near/far interference.

FIG. 5 is a group of plots that illustrate how many pulses, each of which is at a different carrier frequency, may be used to increase the duty cycle while reducing the near/far interference. Transmitting pulses at each of multiple carrier frequencies also enables shorter pulse widths for each pulse, which, in turn, mitigates near/far interference from more closely separated targets. The plots show transmitted pulses $501a$-$501n$ that are directed to a near target and a far target (not shown) and the near return signals $504a$-$504n$ and far return signals $506a$-$506n$ from the targets, where each plot corresponds to a different carrier frequency. The transmitted pulses $501a$-$501n$ may be identically encoded or encoded with different code, as desired. In addition, the transmitted pulses $501a$-$501n$ may be transmitted in overlapping time bins, separated time bins, or adjacent time bins, as shown in FIG. 5. Non-overlapping time bins are generally preferred because transmitting two waveforms at once may require a linear power amplifier, which is much less efficient than the single-amplitude amplifiers used to transmit signals in non-overlapping time bins.

The transmitter and receiver should each have at least the N times the receive bandwidth as a receiver used in single-frequency systems to handle transmission and reception at each carrier frequency. In many cases, it may be desirable to use adjacent carrier frequencies or near adjacent carrier frequencies to minimize the overall receiver bandwidth and to maximize the coherent integration gain across the carrier frequencies by minimizing the frequency dependence of the targets' radar cross sections. Using a single receiver to detect the return signals $504a$-$504n$, $506a$-$506n$ minimizes complexity at the receiver, but multiple receivers and/or transmitters could also be used, albeit at the expense of higher system complexity and cost.

Using multiple pulses at different frequencies makes it possible to reduce the width of each individual pulse while projecting the same total amount of energy and bandwidth to the target. As a result, return signals are less likely to overlap significantly with return signals from adjacent targets. In FIG. 5, for example, there are N transmitted pulses $501a$-$501n$, so each pulse may be 1/N times as wide as a single pulse of the same amplitude. In this case, the near and far targets are so close to each other that each near return signal $504a$-$504n$ overlaps with the corresponding far return signal $506a$-$506n$. The return signals $504a$-$504n$, $506a$-$506n$ are much narrower than in the single-frequency case, however, so there is less overlap than would the case if the targets were illuminated with a longer single-frequency pulse. As a result, there is less near/far interference in the correlation peaks produced by performing pulse compression on the received returns $504a$-$504n$, $506a$-$506n$.

Near/far interference can be further mitigated by applying the pulse compression techniques described with respect to FIGS. 2A-2C to each pair of near/far return signals, which are separated at the receiver by tunable filters or filter banks. Overlapping regions $515a$-$515n$ associated with each set of return signals are weighted (e.g., selectively attenuated), and the leading portions $514a$-$514n$ of the near return signals $504a$-$504n$ and trailing portions $516a$-$516n$ of the far return signals $506a$-$506n$ are pulse compressed as above. In the example of FIG. 5, the near and far return signals $504a$-$504n$, $506a$-$506n$ have substantially equal amplitudes, but this may not necessarily be the case. If the amplitudes are different, the stronger signal may not have to be weighted at all. Combining the results from processing each pair of return signals results in a further increase to effective signal-to-noise-ratio (SNR) of the resulting range peak.

Figure 6:
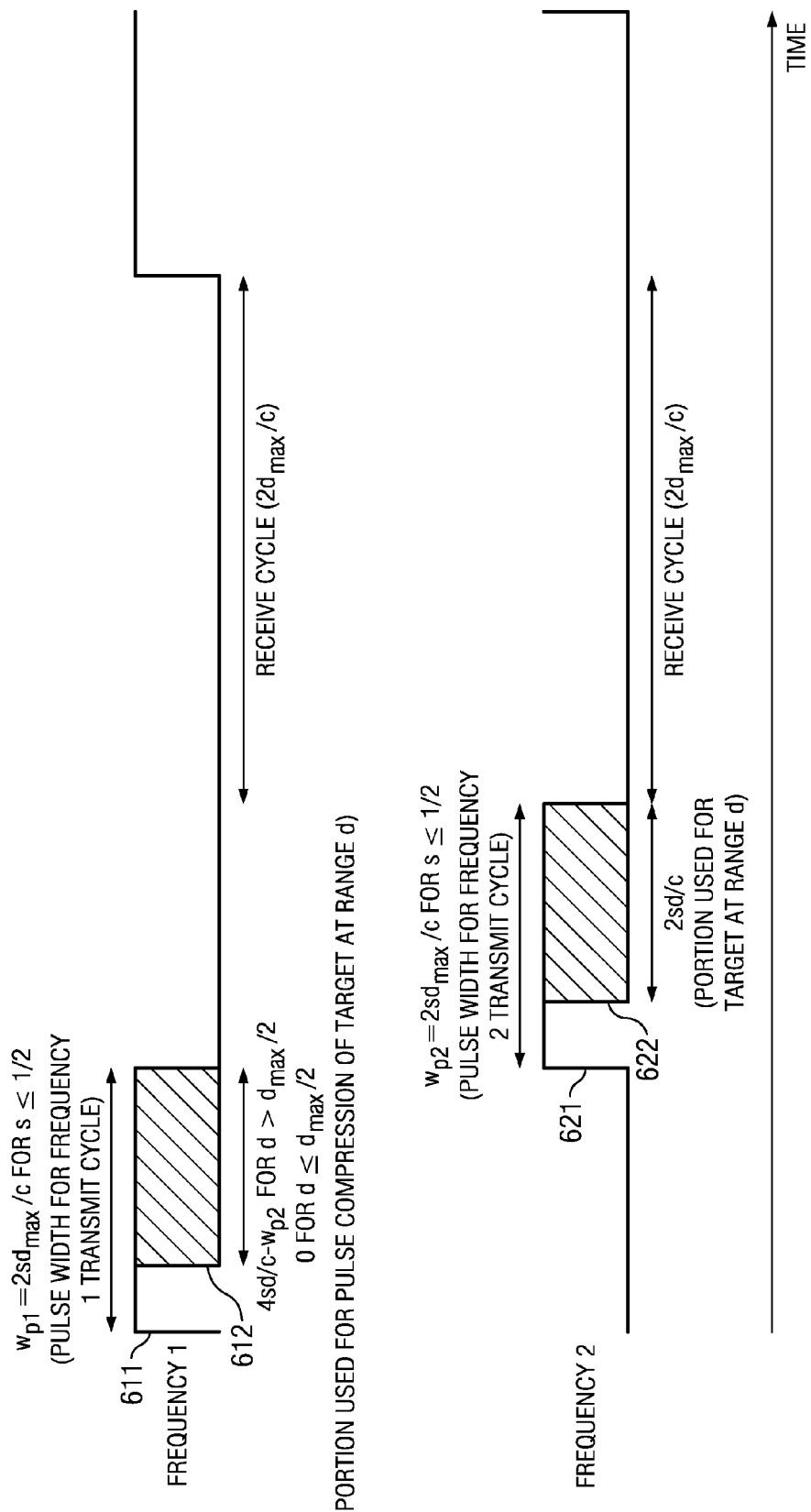
FIG. 6 illustrates how linear pulse width scaling can be used with multi-frequency pulse compression techniques.

FIG. 6 illustrates how multi-frequency processing can be combined with the linear scaling described above to improve the effective SNR and increase the maximum duty cycle. In this example, a two-frequency system transmits a first pulse 611 at a first carrier frequency, then transmits a second pulse 621 immediately afterwards at a second carrier frequency. Two frequencies are used so that return signals from close targets at the second carrier frequency do not interfere with return signals from far away targets at the first carrier frequency. The received return signals are processed when the transmitter is off since transmission could interfere with reception.

In this example, the first pulse 611 is used for targets that are in the range $d_{max}/2 < d \leq d_{max}$ and has a pulse width of $w_{p1}$, which is equal to $2sd_{max}/c$ when $s \leq \frac{1}{2}$. When $\frac{1}{2} \leq s < 1$, $w_{p1}$ is equal to $d_{max}/c$. The portion 612 of the first pulse 611 selected for pulse compression is equal to $4sd/c - w_{p2}$ when $d > d_{max}/2$ and 0 when $d \leq d_{max}/2$. The width of the second pulse 621 is $w_{p2}$, which is equal to $sd_{max}/c$ when $s \leq \frac{1}{2}$, and the portion 622 of the second pulse 621 selected for pulse compression is $2sd/c$, which is the same as in the single-frequency case. However, setting $s > \frac{1}{2}$ in a dual frequency system may degrade performance due to higher near/far interference levels compared to the $s = \frac{1}{2}$ case without any compensating increase in duty cycle.

The selected portions 612, 622 of the first and second pulses 611, 621 are integrated coherently for pulse compression. It is also possible to perform incoherent integration of pulse compression results form two frequencies. The point is to put as much radar energy as possible on the far away targets. This should not result in significant degradation in radar performance for closer targets because return power varies as $1/d^4$, meaning that closer targets generate much larger returns (for a given radar cross section), while the pulse portions 612, 622 for pulse compression in two frequencies vary linearly with d. Therefore, even with the higher pulse widths provided by using two frequencies, the far away target returns have lower SNRs after pulse compression than returns from closer targets.

When $\frac{1}{2} \leq s$, the maximum achievable duty cycle for a two-frequency system is 50%. However, when $s < \frac{1}{2}$, the maximum achievable duty cycle is equal to $2s/(2s+1)$, which is less than 50%. More than two frequencies can be used in order to obtain higher duty cycle when $s < \frac{1}{2}$. In a three-frequency system with pulse widths $w_{p1} = w_{p2} = w_{p3} = 2sd_{max}/c$ when $s < \frac{1}{3}$, and $w_{p1} = w_{p2} = w_{p3} = 2d_{max}/3$ when $\frac{1}{3} \leq s < \frac{1}{2}$, the receive cycle is still $2d_{max}/c$. When $\frac{1}{3} \leq s < \frac{1}{2}$, the maximum duty cycle achievable is still 50%. In general, smaller values of s require more carrier frequencies to achieve the maximum duty cycle, 50%.

Interference-Mitigating Radars

Figure 7:
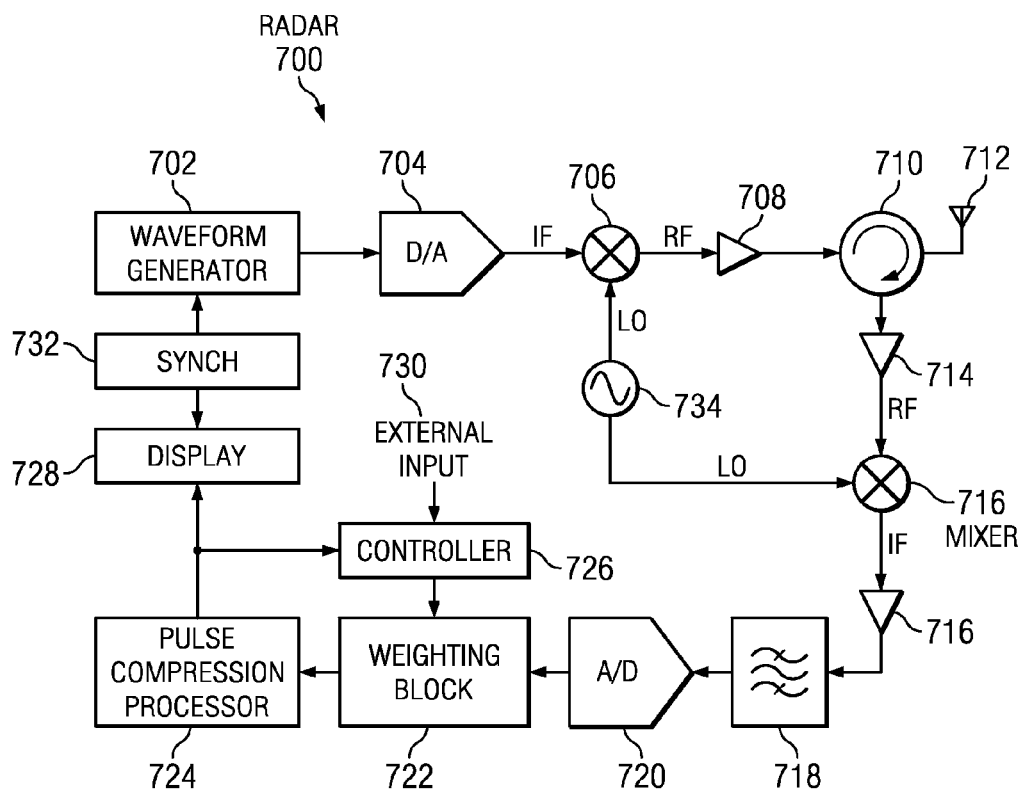
FIG. 7 is a block diagram that shows a radar capable of performing pulse compression that mitigates near/far interference.

FIG. 7 is a block diagram of an example radar 700 that operates using the pulse weighting and compression techniques described above. A digital waveform generator 702 generates a series of coded or chirped pulses centered at a baseband or intermediate frequency (IF). A digital-to-analog converter (D/A) 704 converts the digital pulses from the waveform generator 704 into an analog signal that is mixed in a mixer 708 with a local oscillator (LO) from a radio-frequency (RF) synthesizer 734 to a form a higher-frequency RF signal. The RF signal is amplified with an amplifier 708, then coupled to the antenna 712 via a circulator 710, which prevents transmitted RF energy from leaking into the receive side of the radar 700.

The antenna 712 transmits the analog RF signal and receives return signals formed by radiation that is reflected or scattered from the targets. The circulator 710 couples the received return signals from the antenna 712 to a low-noise amplifier 714, which amplifies the received return signals. The amplified return signals are mixed down to baseband with another mixer 716, which is also coupled to the synthesizer 734. The baseband signals are amplified with a third amplifier 716, then filtered with a passband filter 718 before being digitized with an analog-to-digital converter (A/D) 720. The digitized signal is weighted with a weighting block 722 to mitigate near/far interference as described above, and the weighted return signals are processed with a frequency-domain pulse compression processor 726 to provide range information that may be shown on a display 728. (Those skilled in the art will appreciate that time-domain pulse compression processors may also be used to process signals with the techniques described above.) A synchronizer 732 synchronizes the range information shown on the display 728 to the pulses generated by the waveform generator 702.

The weighting applied to the digitized returns can be adjusted with a controller 726 operably coupled to the weighting block 722. The controller 726 may set the weighting based on a priori knowledge of the emitted pulse train and/or estimates of the target size and distribution. It can also adjust the weighting adaptively, e.g., based on near/far interference in the range information from the pulse compression processor 724. Alternatively, the controller 726 may adjust the weighting in response to external input, such as input from the radar operator or from another processor. Those skilled in the art will appreciate that other variations are possible as well. For example, the receiver can have multiple down-conversion stages.

Figure 8:
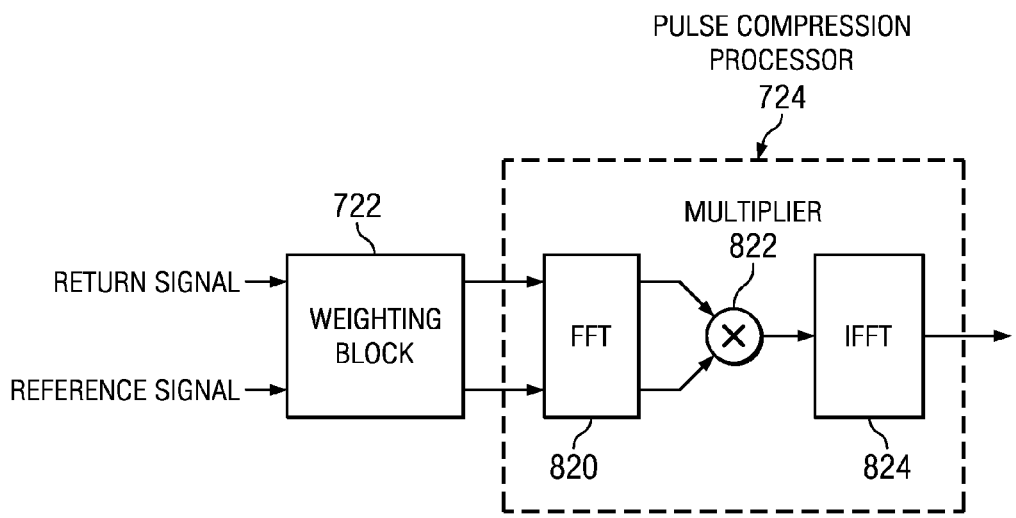
FIG. 8 is a block diagram of the weighting block and pulse compression processor shown in FIG. 7.

FIG. 8 is a block diagram that further illustrates the operation of the example weighting block 722 and the example frequency-domain pulse compression processor 724 shown in FIG. 7. The weighting block 722 operates on the digitized return signals, as described above, and couples the resulting weighted return signals to the processor 724. The weighting block 722 also weights a reference signal, such as a copy of the transmitted pulses from the waveform generator 702 (FIG. 7), to produce a weighted reference signal suitable for correlating with the weighted return signals. Although the weighting block 722 shown in FIG. 8 operates on the return and reference signals in parallel, other suitable weighting blocks may operate on the return and reference signals in series to reduce the peak computational load.

An FFT block 820 in the pulse compression processor 724 produces frequency-domain representations of the weighted return and reference signals, which are multiplied together with a multiplier 822 to produce a frequency-domain product. Here, the FFT block 820 operates on the weighted return and reference signals in parallel, but other suitable FFT blocks may operate on the weighted return and reference signals in series to reduce the peak computational load. An IFFT block 824 inverse Fourier transforms the frequency-domain product, yielding a time-domain correlation peak that represents the targets' range from the antenna 712 (FIG. 7). Thanks to weighting, the correlation peak is substantially fear of near/far interference.

To summarize, example embodiments include radar systems that achieve high duty cycle desired for modern solid-state transmitter technology while mitigating potential near/far target interference in pulse compression. With higher duty cycles, the peak transmitter power requirement can be reduced. Alternately, the antenna aperture size can be reduced while maintaining the equivalent performance. Therefore, compared to conventional radars, example embodiments have significantly reduced transmitter peak power requirements and/or reduced antenna aperture sizes. These improvements may result in significant performance enhancements and/or cost savings.

Example embodiments of the present inventive methods and apparatus may be used with any radar system that uses high duty cycle transmitters and needs to simultaneously detect and/or track targets that are near as well as the targets that are far. For example, preferred embodiments may be used with and encompass mechanically scanning radars, phased array radars, multiple simultaneous beam radars, Doppler radars, M-out-of-N detection radars, Synthetic Aperture Radars (SAR), Inverse Synthetic Aperture Radar (ISAR), etc. Potential applications include but are not limited to airborne radar, maritime radar, air surveillance, space surveillance, maritime radar, automotive radar, and other radar applications. Other embodiments may be used in sonar, ladar, lidar, and other remote sensing applications.

While this invention has been particularly shown and described with references to example embodiments thereof, it will be understood by those skilled in the art that various changes in form and details may be made therein without departing from the scope of the invention encompassed by the appended claims. In addition, there may be many adjustments required for practical applications. For example, there may be a gap time for the radars to transition between transmitting and receiving. In such systems, there may be corresponding minimum detectable distance adjustments as well as minor duty cycle losses.

What is claimed is:

1. A method of determining range information associated with a target, the method comprising:
   receiving a near return signal reflected from a near target;
   receiving a far return signal reflected from a far target, at least a portion of the far return signal overlapping in time with the near return signal;
   generating a reference signal that corresponds to the far return signal;
   weighting at least part of either the far return signal or the reference signal to produce a weighted far return signal or a weighted reference signal, respectively; and
   performing pulse compression using the weighted far return signal or the weighted reference signal to determine range information associated with the far target that is at least partially free of interference from the near return signal.

2. The method of claim 1 wherein weighting the at least part of the far return signal or the reference signal includes applying a weighting function whose shape varies as a function of time delay associated with the far return signal.

3. The method of claim 2 wherein the width of the weighting function varies linearly with the time delay associated with the far return signal.

4. The method of claim 1 wherein weighting the at least part of the far return signal or the reference signal includes dividing the far return signal or the reference signal into sub-pulses based on a range to the far target.

5. The method of claim 1 further comprising:
   determining an amount of overlap between the near and far return signals.

6. The method of claim 1 wherein performing pulse compression includes:
   performing a Fourier transform of the weighted far return signal or the weighted reference signal to produce a frequency-domain weighted signal;

performing a Fourier transform of the reference signal or the far return signal to produce a frequency-domain unweighted signal;

multiplying the frequency-domain weighted signal with the frequency-domain unweighted signal to produce a frequency-domain product; and performing an inverse Fourier transform of the frequency-domain product to produce the range information.

7. The method of claim 1 further comprising:
transmitting a pulse towards the near and far targets, the transmitted pulse reflecting off the near and far targets to produce the near and far return signals, respectively.

8. The method of claim 7 wherein the transmitted pulse is a coded pulse or an up-down chirp pulse.

9. The method of claim 7 wherein at least a portion of the transmitted pulse has a bandwidth that is substantially the same as the bandwidth of the entire transmitted pulse.

10. The method of claim 7 wherein performing pulse compression further includes applying a windowing function to the far return signal or the reference signal.

11. The method of claim 7 wherein the pulse is at a first carrier frequency and further comprising:
transmitting another pulse at a second carrier frequency;
receiving another near return signal reflected from the near target;
receiving another far return signal reflected from the far target, at least a portion of the other far return overlapping in time with the other near return signal;
generating another reference signal corresponding to the other far return signal;
weighting at least part of the other far return signal or the other reference signal to produce another weighted far return signal or another weighted reference signal, respectively;
performing pulse compression using the other weighted far return signal or the other weighted reference signal to determine additional range information associated with the far target; and
combining the additional range information with the range information to produce an enhanced estimate of a location of the far target.

12. An apparatus for determining range information associated with a target, the apparatus comprising:
an antenna configured to receive near and far return signals from near and far targets, respectively, at least a portion of the far return signal overlapping with the near return signal;
a weighting block operably coupled to the antenna and configured to weight at least part of far return signal or a reference signal corresponding to the far return signal to produce a weighted far return signal or a weighted reference signal, respectively; and
a pulse compression processor operably coupled to the weighting block and configured to determine range information associated with the far target by performing pulse compression processing on the weighted far return signal or the weighted reference signal.

13. The apparatus of claim 12 further comprising:
an analog-to-digital converter operably coupled to the antenna and the weighting block and configured to produce a digital representation of the far return signal, and wherein the weighting block is configured to weight the part of the portion of the far return signal by operating on the digital representation of the far return signal.

14. The apparatus of claim 12 further comprising:
a controller operably coupled to the weighting block and configured to control the weighting of the far return signal.

15. The apparatus of claim 12 further comprising:
a transmitter configured to transmit a pulse towards the near and far targets via the antenna, the transmitted pulse reflected by the near and far targets to form the near and far return signals, respectively.

16. The apparatus of claim 15 wherein the transmitter is further configured to modulate the transmitted pulse such that at least a portion of the transmitted pulse has a bandwidth that is substantially the same as the bandwidth of the entire transmitted pulse.

17. The apparatus of claim 15 wherein the transmitter is further configured to transmit pulses at different center frequencies towards the near and far targets, wherein the antenna is further configured to receive return signals at the different center frequencies.

18. The apparatus of claim 17 further comprising:
a filter operably coupled to the antenna and configured to discriminate between returns at the different center frequencies, and wherein the pulse compression processor is further configured to determine range information associated with at least one target using the return signals at the different center frequencies.

19. A method of processing a radar signal, the method comprising:
receiving a first return signal that overlaps in time with a second return signal;
sampling the first return signal to produce a first return vector;
weighting samples in the first return vector based on an amount of overlap between the first and second return signals to produce a weighted first return vector; and
processing the weighted first return vector to obtain range information.

20. The method of claim 19 further comprising:
receiving the second return signal and wherein receiving the first return signal begins after receiving the second return signal.

21. The method of claim 19 wherein sampling the first return signal includes zero-padding the first return vector.

22. The method of claim 19 wherein weighting samples in the first return vector includes adjusting an amplitude of samples in portions of the first return vector that include information associated with the second return signal.

23. The method of claim 19 wherein weighting samples in the first return vector includes setting samples to zero to mitigate interference from the second return signal.

24. The method of claim 19 wherein the amount of overlap is known a priori or estimated based on a priori knowledge.

25. The method of claim 19 further comprising:
determining the amount of overlap between the first and second return signals.

26. The method of claim 19 further comprising:
receiving a third return signal that overlaps in time with a fourth return signal;
sampling the third return signal to produce a second return vector;
weighting samples in the second return vector to produce a weighted second return vector that is at least partially free of interference from the fourth return signal;
processing the weighted second return vector to obtain range information that is substantially free of interference from the fourth return signal; and combining the range information that is substantially free of interference from the fourth return signal with the range information that is substantially free of interference from the second return signal.

27. An apparatus for determining range information associated with a target, the apparatus comprising:
  means for receiving a near return signal reflected from a near target and for receiving a far return signal reflected from a far target, at least a portion of the far return signal overlapping in time with the near return signal;
  means for weighting at least part of the portion of the far return signal that overlaps with the near return signal to produce a weighted far return signal that is at least partially free of interference from the near return signal; and
  means for performing pulse compression on the weighted far return signal to determine range information associated with the far target.

28. A method of determining range information associated with a target that is farther from a receiver than at least one other target, the method comprising:
  receiving a plurality of return signals reflected from the target, each return signal being at a different carrier frequency;
  generating a plurality of reference signals, each reference signal corresponding to a respective return signal;
  weighting at least two of either the plurality of return signals or the plurality of reference signals to produce at least two weighted return signals or at least two weighted reference signals, respectively; and
  performing pulse compression on the weighted return signals or the weighted reference signals to determine range information associated with the target that is at least partially free of interference from the at least one other target.

* * * * *